US008196186B2

(12) United States Patent
Mityagin et al.

(10) Patent No.: US 8,196,186 B2
(45) Date of Patent: Jun. 5, 2012

(54) SECURITY ARCHITECTURE FOR PEER-TO-PEER STORAGE SYSTEM

(75) Inventors: Anton Mityagin, La Jolla, CA (US); Denis X Charles, Redmond, WA (US); Kristin E. Lauter, La Jolla, CA (US)

(73) Assignee: Microsoft Corporation, Redmond, WA (US)

( * ) Notice: Subject to any disclaimer, the term of this patent is extended or adjusted under 35 U.S.C. 154(b) by 874 days.

(21) Appl. No.: 12/123,979

(22) Filed: May 20, 2008

(65) Prior Publication Data
US 2009/0290715 A1 Nov. 26, 2009

(51) Int. Cl.
H04L 29/06 (2006.01)
(52) U.S. Cl. .................. 726/4; 726/9; 726/10; 713/159; 713/168
(58) Field of Classification Search .................. 726/9, 10
See application file for complete search history.

(56) References Cited

U.S. PATENT DOCUMENTS

| | | | |
|---|---|---|---|
| 7,046,995 B2 | 5/2006 | Rygaard | |
| 7,120,691 B2 | 10/2006 | Goodman et al. | |
| 7,130,921 B2 | 10/2006 | Goodman et al. | |
| 7,170,999 B1 * | 1/2007 | Kessler et al. ................. | 380/277 |
| 2003/0088571 A1 | 5/2003 | Ekkel | |
| 2003/0105812 A1 | 6/2003 | Flowers, Jr. et al. | |
| 2004/0034776 A1 * | 2/2004 | Fernando et al. ............. | 713/171 |
| 2004/0111515 A1 * | 6/2004 | Manion et al. ................. | 709/227 |
| 2004/0122958 A1 | 6/2004 | Wardrop | |
| 2004/0184478 A1 | 9/2004 | Donescu et al. | |
| 2005/0044146 A1 | 2/2005 | Nassor et al. | |
| 2005/0071481 A1 | 3/2005 | Danieli | |
| 2006/0226950 A1 * | 10/2006 | Kanou et al. .................. | 340/5.61 |
| 2007/0006291 A1 * | 1/2007 | Barari et al. .................... | 726/10 |
| 2007/0055877 A1 | 3/2007 | Persson et al. | |
| 2008/0126445 A1 * | 5/2008 | Michelman ................... | 707/204 |
| 2008/0147821 A1 * | 6/2008 | Dietrich et al. ............... | 709/216 |

FOREIGN PATENT DOCUMENTS

| | | |
|---|---|---|
| KR | 20040102968 A | 12/2004 |
| WO | WO2007024970 A3 | 6/2007 |
| WO | WO2007112692 A1 | 10/2007 |

OTHER PUBLICATIONS

Berket et al., "PKI-Based Security for Peer-to-Peer Information Sharing", 2004, Proceedings of the Fourth International Conference on Peer-to Peer Computing.*
Dubey, et al., "Security in Peer-to Peer Systems", available at least as early as Aug. 28, 2007, at <<http://www.cs.ucsd,edu/classes/fa01/cse221/projects/group14.ps>>, pp. 9.

(Continued)

*Primary Examiner* — Taghi Arani
*Assistant Examiner* — Thaddeus Plecha
(74) *Attorney, Agent, or Firm* — Lee & Hayes, PLLC

(57) ABSTRACT

An exemplary method includes receiving a request to register a peer in a peer-to-peer system; generating or selecting a transaction key for the peer; storing the transaction key in association with registration information for the peer; transmitting the transaction key to the peer and, in response to a request to perform a desired peer-to-peer transaction by another peer, generating a token, based at least in part on the transaction key. Such a token allows for secure transactions in a peer-to-peer system including remote storage of data and retrieval of remotely stored data. Other exemplary techniques are also disclosed including exemplary modules for a peer-to-peer server and peers in a peer-to-peer system.

22 Claims, 8 Drawing Sheets

OTHER PUBLICATIONS

Berket, et al., "Securing Resources in Collaborative Environments: A Peer-to-peer Approach", available at least as early as Aug. 28, 2007, at <<http://dsd.lbl.gov/publications/mrt/SciShareIASTED.pdf>>, pp. 6.

Matsubara, et al., "File Management Using Virtual Directory Architecture for Central Managed P2P Information Sharing System (NRBS)", at <<http://www.jstage.jst.go.jp/article/ipsjdc/1/0/26/_pdf>>, IPSJ Digital Courier, vol. 1, Jan. 2005, pp. 26-35.

* cited by examiner

SECURITY ARCHITECTURE FOR PEER-TO-PEER STORAGE SYSTEM

BACKGROUND

A typical centralized peer-to-peer (P2P) storage system involves a central server and a large number of user machines (peers). Such a system allows users to store/retrieve data from the other peers. While the central server stores all location information of user data and is responsible for routing decisions, most all of the data operations are handled by corresponding peers in a manner where the server does not store or receive any of the corresponded data. For example, a peer may wish to store data remotely. In this example, the peer can split a file into smaller data files, contact the server for facilitating routing decisions and then route the smaller data files to multiple peers (e.g., file 1 to peer 1, file 2 to peer 2, etc.).

While some P2P storage systems do not require any security features, some P2P applications may require a security mechanism to ensure that peers follow imposed protocols. For example, where an application provides for sharing copyrighted files, a server may impose a protocol that restricts distribution, remote storage and corruption of the files.

In a P2P system, it is normally assumed that a majority of the peers is honest and not adversarial. Further, it is unlikely that a large number of peers would mount a coordinated attack against the P2P system. However, on the other hand, malicious network requests are easy to mount.

In a malicious network attack, an adversary normally has access to the communication protocol of the system or at least relevant parts of the protocol. In such a situation, an adversary can make illegitimate network requests, for example, an adversary may send malicious requests on behalf of other peers or on behalf of the server.

In another situation, an adversary may launch an attack that aims to change code on one or more peer machines. While a P2P system may obfuscate binaries deployed to peer machines, it is feasible for someone not only to reverse-engineer such aspects of a P2P system but also to implement his own variant of a peer. For example, an adversary can change code on a peer machine by patching an original binary to disable or modify its functionality or by implementing its own peer.

Some examples of attacks are illegitimate use other peer or server machine resources, access to other user's data (e.g., whether for purposes of gaining information or corruption), receiving GADs without providing storage, DOS attacks on the server, and self-distributing worms.

As described herein, various exemplary techniques provide for security measures in a P2P system that can confound adversarial attacks and promote confidence in peer-to-peer transactions.

SUMMARY

An exemplary method includes receiving a request to register a peer in a peer-to-peer system; generating or selecting a transaction key for the peer; storing the transaction key in association with registration information for the peer; transmitting the transaction key to the peer and, in response to a request to perform a desired peer-to-peer transaction by another peer, generating a token, based at least in part on the transaction key. Such a token allows for secure transactions in a peer-to-peer system including remote storage of data and retrieval of remotely stored data. Other exemplary techniques are also disclosed including exemplary modules for a peer-to-peer server and peers in a peer-to-peer system.

DESCRIPTION OF DRAWINGS

Non-limiting and non-exhaustive examples are described with reference to the following figures.

DETAILED DESCRIPTION

As described herein, an exemplary protocol provides for security measures in a P2P system that can confound adversarial attacks. Such a protocol may be implemented in a P2P system that provides for sharing information, remote storage of information and remote backup of information. Further, an exemplary architecture acts to minimize peer decisions that can affect performance of an entire P2P system (e.g., such as content distribution policy). In various examples, an adversary is unlikely to gain access to system resources, such as credits, reputation (such as connection speed or availability) or storage. An exemplary protocol provides for security mechanisms that raise a strong defense against such attacks.

An exemplary protocol guarantees that a peer can only do data operations which are authorized by a P2P server (e.g., a server in a P2P system that handles routing and optionally other operations). Such a protocol supports:

(a) storing data where a peer contacts the server to obtain location information for the data and where a peer contacts a peer specified by the server and transmits the data to the peer for storage; and (b) retrieving data where a peer contacts the server to obtain location information for the data and where a peer contacts a peer specified by the server and obtains the data as stored by the peer.

An exemplary protocol provides the following security guarantees:

(a) Data security—data can be retrieved only by authorized users (i.e., authorized peers); no other user can read or modify the data;

(b) Storage security—a peer can only participate in data exchange transactions which are authorized by the server; and (c) Control security—an active adversary cannot impersonate a peer or a server and force other peers to participate in unauthorized transactions.

An exemplary protocol can be implemented in a storage exchange P2P system. Such a storage exchange P2P system allows peers to back up their data on other peers' machines, for example, at a cost of providing some disk space for other peers to backup their data. Such a system may implement a policy such as after "sharing" 1.5 GB of your hard drive space a peer is allowed to backup 1 GB of his personal files on one or more other peer machines. A storage exchange system can implement an exemplary protocol to secure all peer-peer and peer-server transactions.

In various examples, a peer may be referred to as client or a user. In some examples, the terms client and server are used to represent a peer and a server associated with a P2P system that acts to manage routing and optionally other operations. Hence, some examples refer to client-server, client-client and server-client interactions. While various examples are set forth in the context of a P2P system, the exemplary techniques may be applied in one or more other contexts that require or desire secure transactions (e.g., data access, data storage, etc.).

Figure 1:
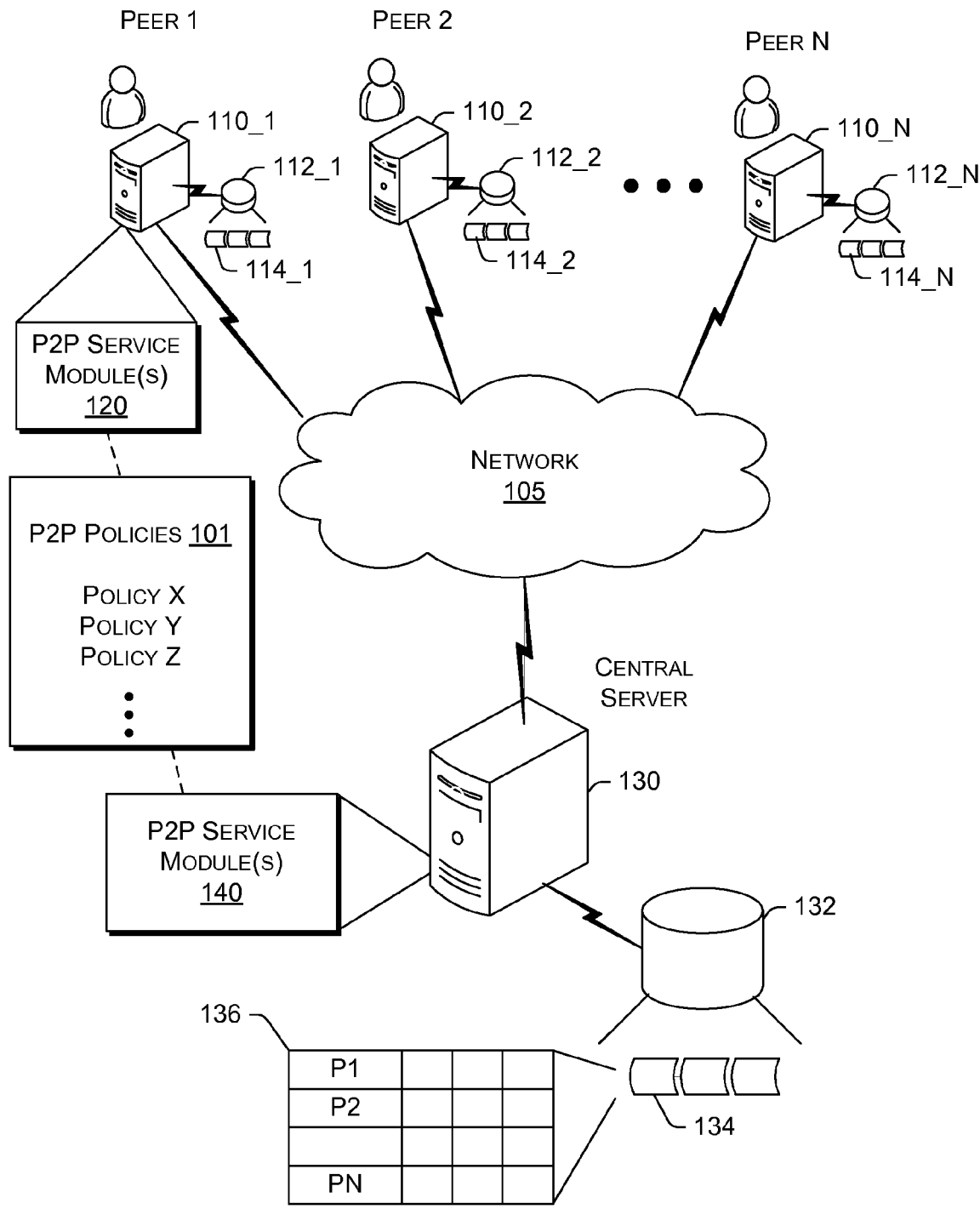
FIG. 1 is a diagram of an exemplary peer-to-peer system.

FIG. 1 shows an exemplary P2P system 100 that operates according to a set of policies 101. The system 100 may represent a security architecture for a peer-peer storage system. As shown, the system 100 includes various peers (Peers 1, 2, . . ., N) that correspond with each other over a network 105 via respective computing devices (computing devices 110_1, 110_2, . . . , 110_N). In the example of FIG. 1, each computing device 110 includes a data store 112 for storing data 114. Each computing device 110 also includes one or more modules for the P2P system 100 that adhere to and implement one or more of the P2P policies 101. The one or more modules 120 are typically software modules that include instructions executable by a computing device to allow a peer to interact with other entities in the P2P system 100.

The P2P system 100 also includes a central server 130 that acts to implement policies of the P2P system 101. In particular, the server 130 acts to maintain and enforce transaction policies for transactions between the peer devices 110 and for transactions between a peer device 110 and the server 130. The server 130 has an associated data store 132 for storing data 134. In the example of FIG. 1, the data 134 includes information 136 about each of the peers in the P2P system (P1, P2, . . . , PN). To implement the policies 101, the server 130 includes one or more P2P service modules 140. The one or more modules 140 are typically software modules that include instructions executable by a computing device to allow a server to interact with other entities in the P2P system 100.

With respect to the P2P policies 101, these are described in more detail below with respect to mechanisms for securing peer-to-peer transactions (e.g., client-to-client); mechanisms for securing server-to-peer transactions (e.g., server-to-client or vice versa); an efficient protocol which uses symmetric cryptography; security tokens; techniques that use cryptographic hash functions to identify data; techniques that use symmetric encryption and message authentication codes to protect data; and techniques that generate user's keys from a master secret key using a cryptographic hash function.

With respect to server-client authentication, such an interaction can take place when either a client contacts the server (for example, to request a list of parties where to store file shares) or a server makes a request to a client (for example, to check the online status of client's machine). All of these sessions must be authenticated to protect against numerous impersonation attacks.

An exemplary method performs server-client authentication via joint secret keys. For example, upon new user registration, the server provides a client with a strong cryptographic secret key. In this example, the server can store secret keys for all registered users (see, e.g., information 136 stored by the server 130). The secret key of a user is then used to authenticate all further server-client and client-server communications. Hence, in such a system, a user must register prior to acquiring a secret key or having a secret key assigned for use in transactions with other peers.

Figure 2:
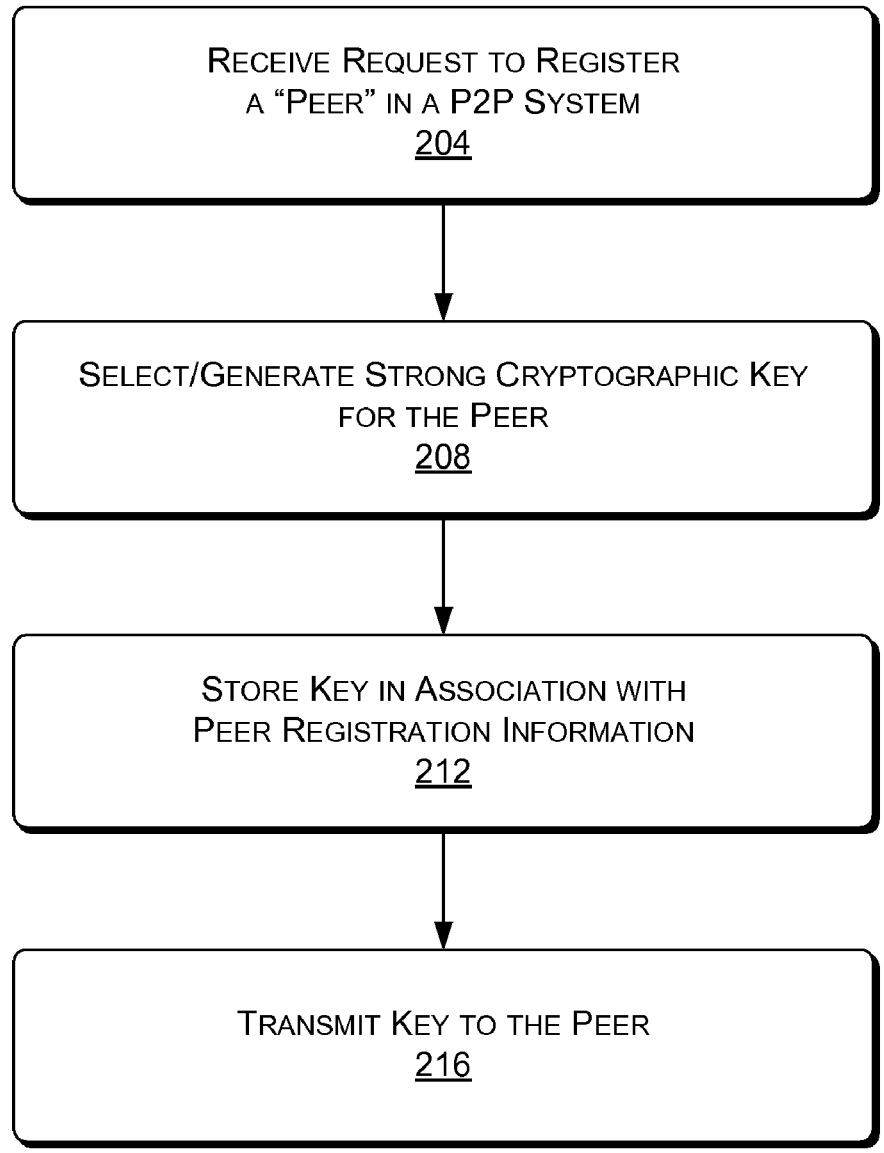
FIG. 2 is a block diagram of an exemplary method for registering a peer in a peer-to-peer system.

FIG. 2 shows an exemplary method 200 for registration of a peer. Such a method may be implemented via a module for execution on a server in a P2P system (see, e.g., the module(s) 1. In a reception block 204, a server receives a request to register a "peer". For example, in FIG. 1, the server 130 may receive a request from the peer device 110_1. This request may follow a secure login procedure where the peer submits a password to gain access to functionality of the server. For example, a peer may create an account with the P2P system where account creation includes password selection or generation. In this example, following account creation, registration is required by the peer to acquire a key or to otherwise have a key assigned to allow for secure transactions with one or more other peers in the P2P system.

In the example of FIG. 2, the peer may login to the server using a protocol such as the Secure Sockets Layer (SSL) protocol or the Transport Layer Security (TLS) protocol. SSL uses the public-and-private key encryption system from RSA, which also includes the use of a digital certificate. Again, in an exemplary P2P system, this is a login policy, which is required prior to registration.

For registration, in a selection or generation block 208, the server selects or generates a strong cryptographic key for the peer. In general, generation of this key does not rely on the peer's password (i.e., it does not rely on a peer's login secret). Hence, a P2P system policy maintains that the strong cryptographic key is not a function of a peer's password. In such a system, keys may be generated in advance and selected randomly when peers register with the service provided by the server. Alternatively, keys may be generated at the time of login or initiation of registration. A server may generate secret keys using a cryptographic random number generator or hash function. Alternatively, a server may acquire secret keys from another source.

As an additional policy related to login and/or registration, to confound automated attacks on the server, the server may implement a human interaction interface for login and/or registration. For example, such an interface may use graphics or sounds that are not amenable to automation. For example, a user may need to respond to a Completely Automated Public Turing Test to tell Computers and Humans Apart (CAPTCHA) challenge prior to or during registration. Such challenge-response systems can help to differentiate humans from automated programs (e.g., bots).

Referring again to the method 200 of FIG. 2, after selection and/or generation 208, a storage block 212 stores the secret key in association with peer registration information. For example, the server 130 of FIG. 1 may store the secret key of a peer in a table 136 in association with the peer's ID (e.g., user name, email, etc.). In general, such information needs to be accessible by the server to facilitate generation of tokens for peer-to-peer transactions.

The method 200 includes a transmission block 216 that transmits the secret key to the peer that requested registration (see, e.g., block 204). Once the peer has its secret key, it can then verify a token, generated by the server, and received from another peer.

Figure 3:
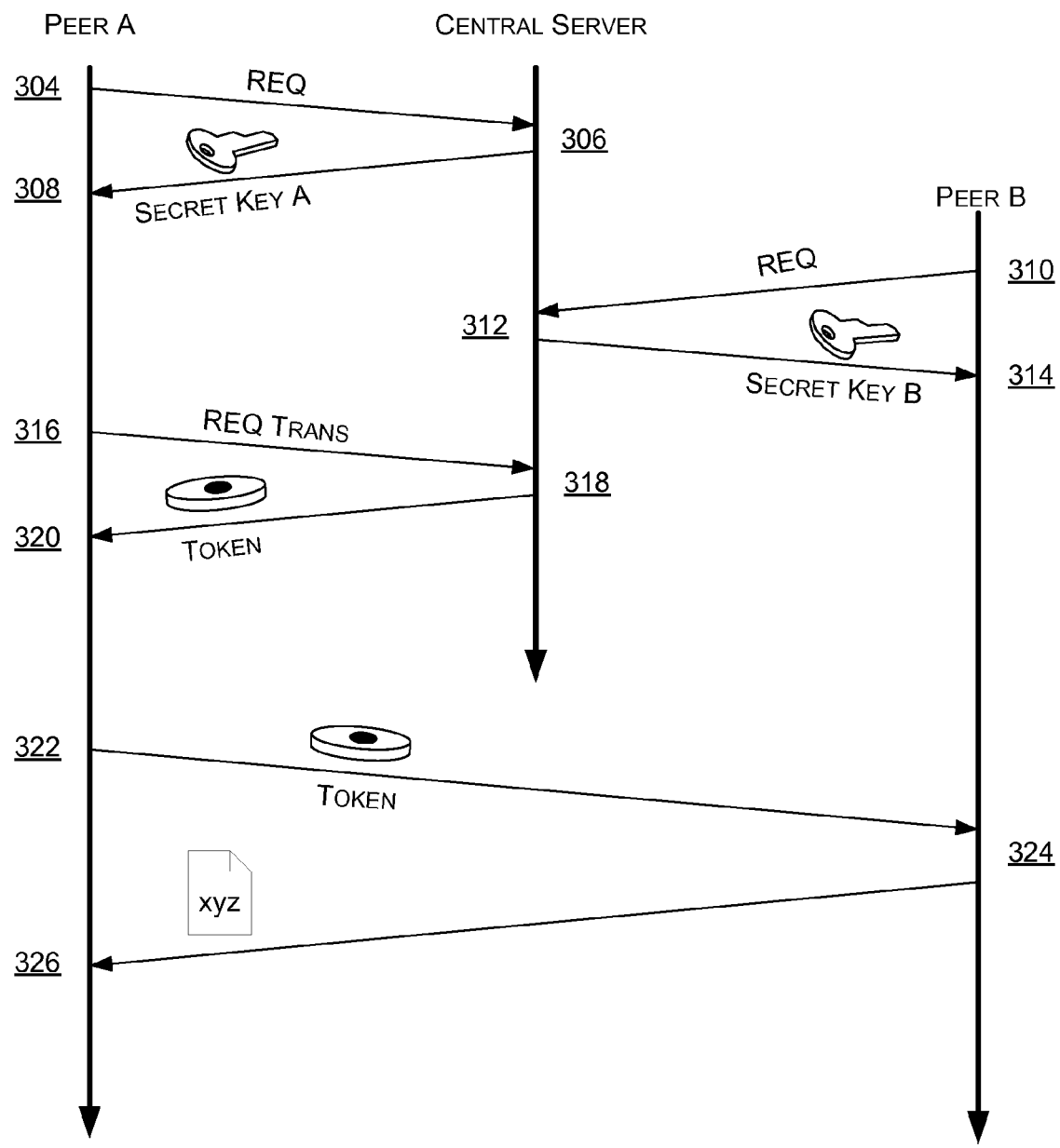
FIG. 3 is a diagram of an exemplary method for performing a peer-to-peer transaction to retrieve a file in a peer-to-peer system.

Prior to describing details of token generation and token format, use of a token in described with respect to FIG. 3, which shows a series of transactions along a timeline in a P2P system such as the system 100 of FIG. 1. In a peer-server transaction, Peer A formulates a request and sends it to a central server (event 304). In turn, the central server receives the request and sends a secret key (Secret Key A) to Peer A (event 306). This transaction terminates when Peer A receives Secret Key A (event 308). In another peer-server transaction, Peer B formulates a request and sends it to a central server (event 310). In turn, the central server receives the request and sends a secret key (Secret Key B) to Peer B (event 312). This transaction terminates when Peer B receives Secret Key B (event 314). Accordingly, each peer now possesses its own secret key and a central server possesses a copy of each of these secret keys. Further, the central server stores each secret key in association with identifying information about its peer (see, e.g., the information 136 of FIG. 1).

In yet another peer-server transaction, Peer A transmits a request to the central server (event 316). This request includes information about a desired transaction. For example, this request may specify "get file name xyz from Peer B" or simply "get file name xyz". Where a request for a desired transaction identifies a peer, then the central server generates a token that includes security information for the identified peer. Where a request for a desired transaction does not identify a peer, but identifies, for example, a file name, then the central server may select a peer that has access to a file with that name (e.g., the peer has a data store that stores the file) and then generate a token that includes security information for the selected peer (e.g., a generic, fungible music file). Per event 318, the central server receives the request, generates a token and sends the token to the peer that sent the request. Once Peer A receives the token (event 320), Peer A may initiate the desired peer-peer transaction.

In the example of FIG. 3, to initiate the desired peer-peer transaction, Peer A sends the token to Peer B (event 322). Peer B receives the token, verifies its authenticity using its secret key (Secret Key B), performs the desired action, such as sending a file having a file name xyz to Peer A (event 324). In turn, Peer A receives the file from Peer B to thereby complete the desired peer-peer transaction.

Figure 4:
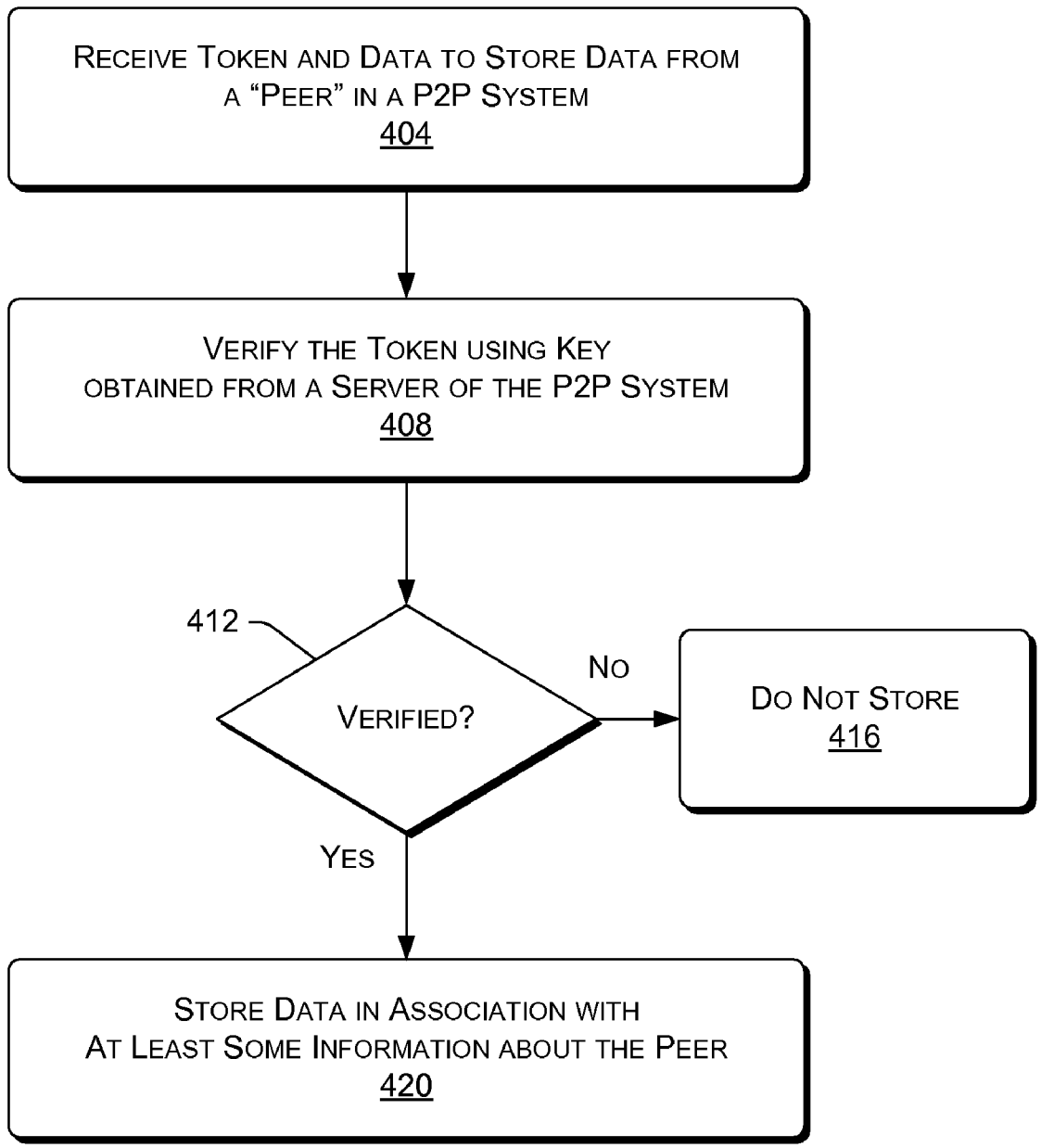
FIG. 4 is a block diagram of an exemplary method for performing a peer-to-peer transaction to store a file in a peer-to-peer system.

While the example of FIG. 3 pertains to retrieving a file from a peer, FIG. 4 shows an exemplary method 400 for storing data (e.g., a file) on another peer. In a reception block 404, a peer receives a token and data from another peer that desires to have this data stored remotely. In a verification block 408, the peer verifies the token using its secret key as obtained from a server in the P2P system (see, e.g., transactions of FIG. 3). In a decision block 412, the peer decides whether the token was successfully verified (e.g., that the requesting peer can be trusted as having obtained a valid token from the P2P server). If the decision block 412 decides that the token could not be verified, then the method 400 continues to a do not store block 416. This block aborts the transaction and optionally sends a status indicator to the requesting peer and/or the P2P server. However, if the decision block 412 decides that the token was successfully verified, then the peer continues at a storage block 420 that stores the data, typically in association with at least some information about the requesting peer.

Hence, as described herein, in an exemplary method the following steps may occur:

i) Peer 1 contacts a P2P server to authenticate itself and to indicate a desired transaction: "I am Peer 1 and I want to put my data on Peer 2";

ii) The P2P server issues a security token, which is grant of permission to perform the desired transaction;

iii) Peer 1 transfers its file with the security token to Peer 2;

iv) Peer 2 verifies the signature of the token using its security key;

v) After verification, Peer 2 accepts the file from Peer 1 and stores it (e.g., on an associated hard drive, etc).

As described herein, an exemplary method can include requesting, as a peer, a token to perform a desired peer-to-peer transaction in a peer-to-peer system; receiving a token generated based at least in part on a transaction key for the peer; and sending the token to another peer to initiate a peer-to-peer transaction. Similarly, a corresponding peer may perform a method that includes receiving a token from a peer in a peer-to-peer system, the token generated based at least in part on a transaction key for the peer and including transaction information for a type of desired peer-to-peer transaction; verifying the token using a different transaction key; and allowing the desired peer-to-peer transaction to occur.

Figure 5:
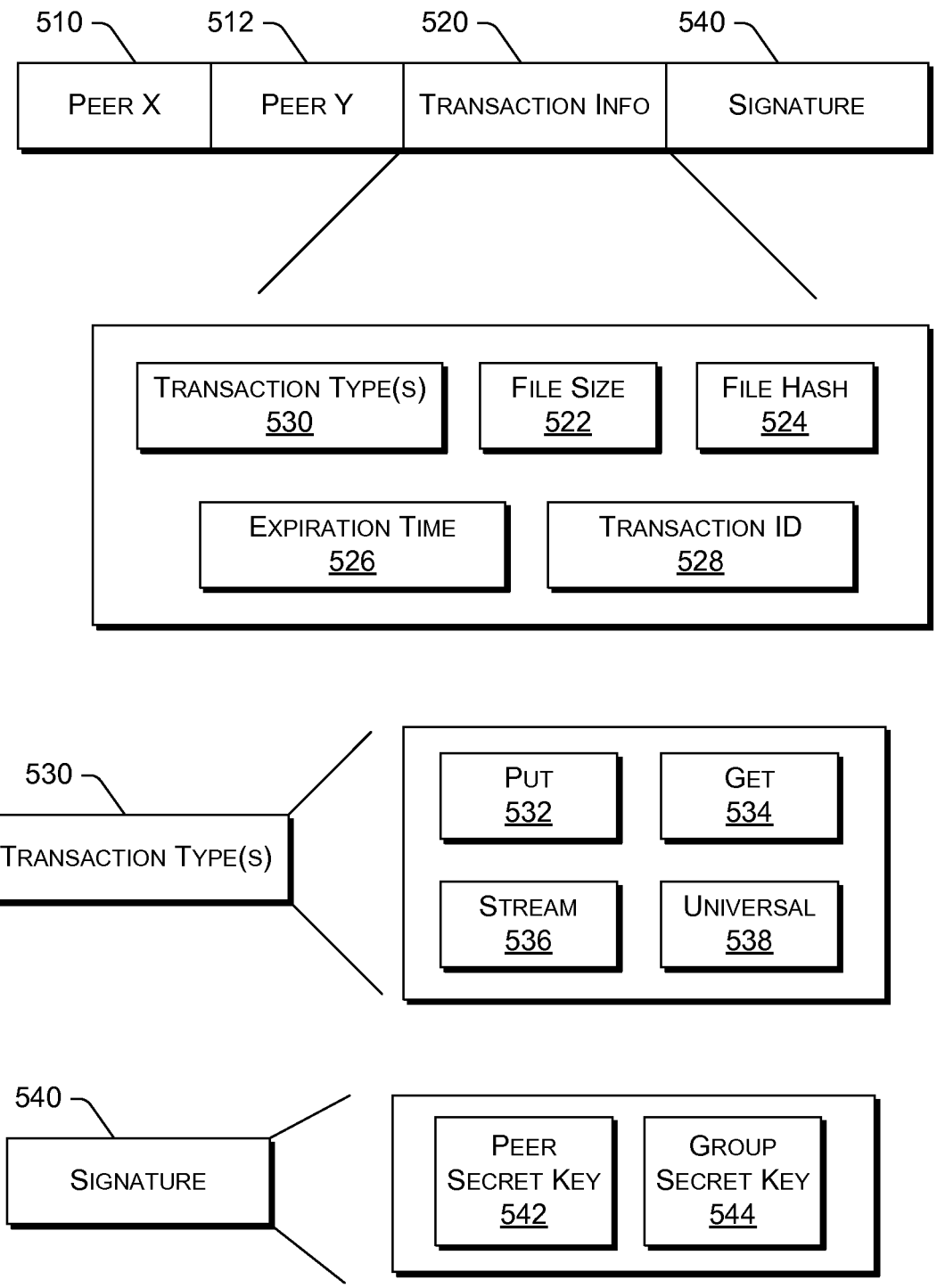
FIG. 5 is a diagram of an exemplary token for one or more peer-to-peer transactions.

FIG. 5 shows an exemplary token 500 that conforms to various policies (see, e.g., policies 101 of FIG. 1). The exemplary token 500 adheres to a particular format for a peer-peer transaction. The format specifies identification of an initiating peer (e.g., Peer X) 510 and one or more corresponding peers (e.g., Peer Y) 512. The format further specifies transaction information 520 and a signature 540; noting that the order of the information specified by the format may be different from that shown in the example of FIG. 5.

In the exemplary token 500, the transaction information 520 may include any of a variety of information, for example, depending on the nature of a desired peer-peer transaction. The transaction information 520 may include one or more of the following: file size 522, file hash 524 (or other concise file identifying information), expiration time 526 (or other time or event sensitive information regarding use of the token), transaction identifier 528 and transaction type(s) 530. With respect to transaction type(s) 530, an exemplary token may be generated for performing a single transaction or multiple transactions. Examples of transaction types include, but are not limited to, put 532 (to store information at a peer), get 534 (to get information stored at a peer), stream 536 (to stream information stored at a peer), and universal 538 (to perform any of a variety of transactions).

With respect to the signature 540, a server generates the signature based at least in part on the one or more corresponding peers 512. In general, a signature is based on a secret key of a single peer 542. However, instances may arise where a group secret key exists for a group of peers 544. In such instances, a single peer may, for example, use a single token to store a file on each of the computing devices (e.g., storage devices) of the peers in the group. Regardless of the arrangement, importantly, a peer involved in the transaction needs to be able to verify the token based its own secret key and the signature 540.

As described herein, an exemplary peer-peer authentication mechanism relies on a token, for example, a server-generated token. According to such a mechanism, prior to making a request to another peer, a peer contacts the server to obtain a token for a desired transaction. For this mechanism to proceed, the peer making the request of the server must provide a certain amount of information to allow the server to generate a token. At a minimum, the peer must typically identify another peer that belongs to the P2P system as the token obtained from the server depends on the secret key of the other peer and represents server authorization for the desired transaction. Of course, in another scenario, a peer may simply identify a file (e.g., a music file) where a P2P system server matches a peer with the identified file and then generates a token with a signature based on a key associated with the matching peer that stores a copy of the identified file. In this latter example, the peer that makes the request may not know a priori the corresponding peer for the transaction.

As explained with respect to FIG. 5, an exemplary token can have the following format:

<Peer 1> <Peer 2> < transaction type: put or get> <file size> <file hash> <expiration time> <transaction ID><signature>

In this example, the token carries particular information germane to a transaction. Specifically, Peer 1 represents the peer initiating a desired transaction, Peer 2 represents a different peer that is involved in the transaction, the transaction type represents information about a type of transaction (e.g., put, get, universal, etc.), the file size represents information about the size of a file involved in the transaction, the file hash represents concise information about the identity of the file, the expiration time represents a time for which the token may expire (e.g., a time in which at least part of the transaction must occur), the transaction ID represents information that identifies the particular transaction and the signature represents information that allows the transaction to occur in a secure manner (e.g., according to some security mechanism). While a particular order of information is shown, information may be in any of a variety of orders in an exemplary token format.

With respect to the signature, an exemplary token can require a signature signed under Peer 2's secret key (also referred to herein as a transaction key) via a secure MAC scheme. In an exemplary P2P system, a P2P server stores the secret keys of the various peers in the system. Hence, the server can generate the signature using a secret key associated with a peer (e.g., Peer 2) identified in a request by another peer (e.g., Peer 1). In the foregoing example, after Peer 1 obtains a token for some transaction, Peer 1 can then initiate a connection with Peer 2 and send the token to Peer 2. In response, Peer 2, using its secret key, verifies the validity and expiration time of the token and (if verification succeeds) allows the indicate transaction to occur. Depending on the nature of the transaction, Peer 2 may initiate some action. For example, where the transaction is to "get" a file, after verification of a token's signature, Peer 2 may access the file and transmit it to Peer 1. As an additional measure, Peer 2 may perform a hash operation on the file and check if the hash result matches the hash of the token. If the hash result does not match, then it is likely that the file, while having the same name, is not accurate. After a transaction has been completed or attempted, Peer 2 (and/or Peer 1) may be required to report completion or other result to the server that issued the token.

As another security measure, a P2P system may require every peer to keep a list of tokens for recently completed transactions in an effort to prevent token re-use. For example, when a new transaction request comes in, a client should first check if the incoming token is in the list. If it is, a transaction may be aborted. In an exemplary system, a policy may require, where a token includes an expiration time, the a peer can keep the token in the list only until expiration of the token.

As described herein, token information should be well formatted to prevent overflow. An exemplary token can have a format that is different from any peer-server messages. Further, tokens can be encrypted, for example, with AES encryption and then signed by HMAC message authentication code.

In an effort to optimize both bandwidth and performance of a P2P server, batching may occur for tokens. For example, when Peer 1 has several files to "put" on Peer 2, Peer 1 can obtain one token for all files. An exemplary batch token can include concatenated token information strings of multiple tokens to Peer 2 which are signed together under Peer 2's secret key.

As mentioned, with respect to types of transactions, a token may specify a "universal" transaction type that allows more than one type of transaction to occur. This specific type of token may be used during peak loads as it requires less information from a requesting peer and less information to be in a token. While such a mechanism acts to diminish security, it offers an opportunity to maintain timely service.

While various aspects of login, registration, secret keys, transactions and tokens have been discussed, the exemplary policies 101 of FIG. 1 may extend to aspects of communications or messages. Further, policies may be implemented at various levels. For example, a policy that ensures server protections may also ensure peer protections.

With respect to communications or messages, peer-server messages can be formatted to confound or prevent message duplication attacks. Such attacks can affect a server and peers. Referring again to the transaction ID 528 of the token 500 of FIG. 5, the transaction ID may be a timestamp, a request count, or other information that can help identify a token or make the token unique. In turn, this makes the message request for the token unique and the message carrying the token to the peer unique.

While the foregoing example described the information as part of a token, such information may be separate from the token. For example, in the timeline of FIG. 3, event 318, performed by the central server, may cause the server to generate a timestamp or to increment a message counter that is associated with the requested transaction. The server may store such information in association with information about the requesting peer, the transaction, etc. Further, the server may append the information to the token or simply include it in a message to the peer that carries the token. Such identifying information can be used to prevent automated attacks on a server or on a peer.

A policy can require that messages include a timestamp or some type of message counter to prevent a message (with some control action) from being "replayed". For example, a peer can send to a P2P server a request to issue a security token to download some specified data (e.g., from another peer). A policy may require that this request is encrypted and that this request can be authenticated by the P2P server. With respect to proper formatting of a so-called control action message, a question arises as to whether the control action message should be valid in the future. An exemplary policy can require that all control action messages include, for example, a timestamp or a counter. In general, such information is generated and noted by a server for peer-server all or certain types of peer-server communications. A P2P server may count messages to provide a message ID, which can be sequential with respect to messages received by the P2P server.

As described herein, messages can be encrypted, signed or encrypted and signed. For example, a P2P system may use an Advanced Encryption Standard (AES) and a Message Authentication Code (MAC) or an authenticated encryption mode of AES. Such security measures may be implemented to conform to a policy or policies of a P2P system.

AES is a NIST-standard cryptographic cipher that uses a block length of 128 bits and key lengths of 128, 192 or 256 bits. In conventional scenarios, a MAC is typically a number computed from the content of a text message and used to prove the integrity of that text message. For example, the MAC can be a checksum that is computed using an algorithm based on the DES or AES ciphers, which use a secret key. In operation, a sender sends a MAC with its corresponding message. A recipient recomputes the MAC using the same algorithm and secret key and compares the recomputed MAC to the MAC that it received from the sender sent (e.g., as sent with its corresponding message). If the recomputed MAC and received MAC are the same, it is assumed that the message has not been tampered with. In such a scenario, a MAC operates like a digital signature, except that a secret key is used rather than a private key.

An exemplary P2P system may use Cipher Block Chaining-MAC, which is a message integrity method that uses block ciphers such as DES and AES. In a typically implementation of such a technique, each block of plaintext is encrypted with a cipher and then XOR'd with a second encrypted block. Then that result is XOR'd with a third encrypted block and so on in series. Hence, an exemplary system may use CBC mode of AES as a security measure.

With respect to a P2P system that allows peers to store data on one or more other peer machines, a policy may be in place that requires peers to encrypt the data prior to remote storage. For example, a peer may derive an encryption key from its master secret key. In such a manner, a P2P server that maintains a copy of the master secret key of a peer can be configured to derive that peer's encryption key. If a peer crashes and/or loses its keys and data, the server can assist by allowing the peer to retrieve backup data and by allowing the peer to decrypt any encrypted backup data. Various examples, discussed below, refer to an "encryption key" as being a key for use in encryption, where such a key may be dependent on or independent of a peer's secret key (e.g., the key used for secure peer-peer transactions).

As described herein, an exemplary server may store a separate secret key or "encryption key" for each user. This encryption key differs from the secret key associated with registration and used for peer-peer transactions. An encryption key may be provided to a server or a server may compute it for a peer, for example, as a hash of a peer's identity and a master secret. An exemplary system may require or automatically update a peer's encryption key on some periodic or frequency basis (e.g., after x transactions). An encryption key may be either stored on a peer's machine or it may be stored on a P2P system server and retrieved by the peer upon secure login to the server. In such a system, the key may exist for the lifetime of the login or it may exist for a longer period of time (e.g., multiple logins). As described herein, with respect to login, an exemplary P2P system may implement a secure mechanism to accommodate automatic login for a peer when a peer's machine is restarted. For example, a system library may store data inside the OS for use upon restart to automatically login to a P2P server.

Figure 6:
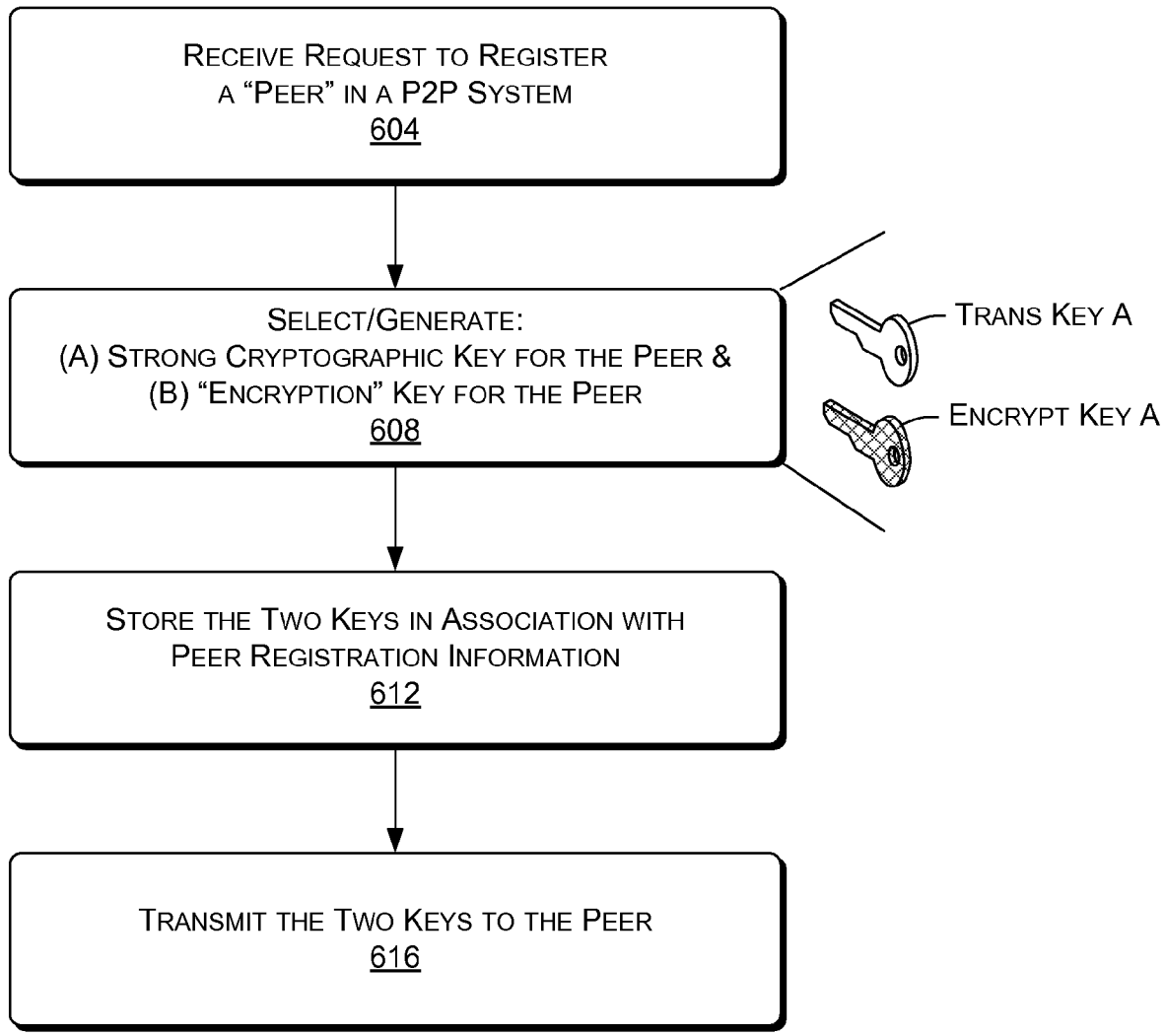
FIG. 6 is a block diagram of an exemplary method for generating or selecting a transaction key and generating or selecting an encryption key for a peer in a peer-to-peer system.

FIG. 6 shows an exemplary method 600 for selecting and/or generating two keys for a peer. In a reception block 604, a server receives a request to register a peer in a P2P system. In response, in a selection/generation block 608, the server generates or selects a strong cryptographic key for the peer and generates or selects an encryption key for the peer. As shown in FIG. 6, one key is referred to as a "transaction key" and the other key is referred to as an "encryption key". In a storage block 612, the server stores the two keys in association with some identifying information for the peer. In a transmission block 616, the server transmits the two keys to the peer.

With respect to peer-peer authentication, such authentication can take place using a transaction key when a peer stores/retrieves files from another peer. Impersonation of client-client authentication is one way to abuse a P2P system. For example, a malicious user (whether a member of the system or not) can attempt to store his data on any peer without getting permission from the server (e.g., without paying for such a service). As described herein, an exemplary protocol helps to ensure that peers only serve requests which are authorized by a P2P server. Again, such assurance relies on a transaction key for each peer that is accessible by the P2P server.

Figure 7:
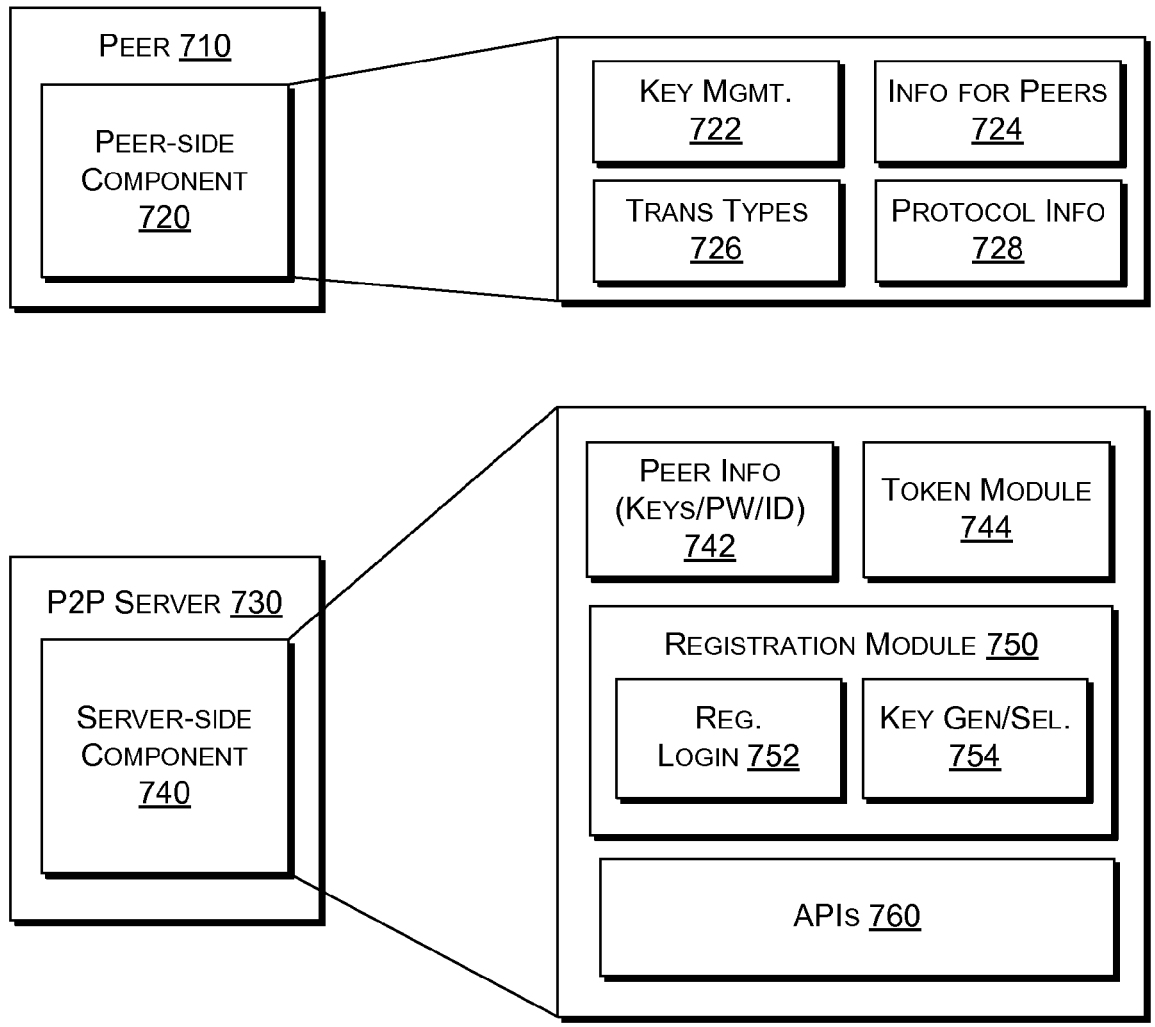
FIG. 7 is a block diagram of various exemplary modules for a peer-to-peer system.

FIG. 7 shows various exemplary modules 700 that can be used in a security architecture for a P2P system. A peer 710 includes a peer or client-side component that includes various modules that allow the peer 710 to interact in a P2P system. The modules includes a key management module 722 to manage one or more secret keys where the secret keys include at least one key for use in performing transactions, a names module 724 for ID information for other peers in the P2P system, a transaction type(s) module 726 that indicates the types of transactions that may occur in the P2P system, a protocol information module 728 that ensures that the peer 710 communicates according to a protocol or protocols of the P2P system.

A P2P server 730 includes a server-side component 740 that includes various modules that allow the server 730 to maintain and implement policies for a P2P system. In the example of FIG. 7, the modules include a peer information module 742 (e.g., for keys, passwords, identification information, etc.), a token module 744 for generating tokens, a registration module 750 for registering peers in a P2P system and a set of application programming interfaces (APIs) 760 for allowing peers to easily communicate with the server. For example, the peer 710 may make an API call to request a transaction and, in response, the server 730 may issue a token for the requested transaction. APIs may also allow for login, registration, and other peer management and functionality. A data protection API can implement secure key storage on peer's machine. The registration module 750 includes a module 752 for registration login and another module 754 for key generation and/or selection. For example, the module 754 may generate or select one or more secret keys for use by peers in a P2P system.

As described herein, an exemplary module for a peer in a peer-to-peer system can include computer-executable instructions to call an application programming interface of a server in the peer-to-peer system where the call specifies a type of peer-to-peer transaction and returns a token for the transaction, computer-executable instructions to send a token to another peer to initiate a peer-to-peer transaction and computer-executable instructions to verify a token received by another peer to thereby allow a peer-to-peer transaction to occur. A peer module may also include computer-executable instructions to send information to a server in a peer-to-peer system in response to failure to verify a token received by another peer.

As described herein, an exemplary module for a peer-to-peer server can include computer-executable instructions to generate or select a transaction key for a peer in the peer-to-peer system, computer-executable instructions to store a transaction key for each peer in the peer-to-peer system, computer-executable instructions to transmit a transaction key for a peer in the peer-to-peer system to the peer; and computer-executable instructions to generate tokens for transactions between peers in the peer-to-peer system based on a receipt of a request by a peer wherein a token comprises a signature based on a transaction key of another peer. Such a module may include computer-executable instructions to determine if a peer-to-peer transaction occurred successfully based at least in part on information received from the other peer.

As described with respect to the APIs 760, a module may include computer-executable instructions for an application programming interface to receive information from a peer in the peer-to-peer system and to return a token in response.

Exemplary Computing Device

Figure 8:
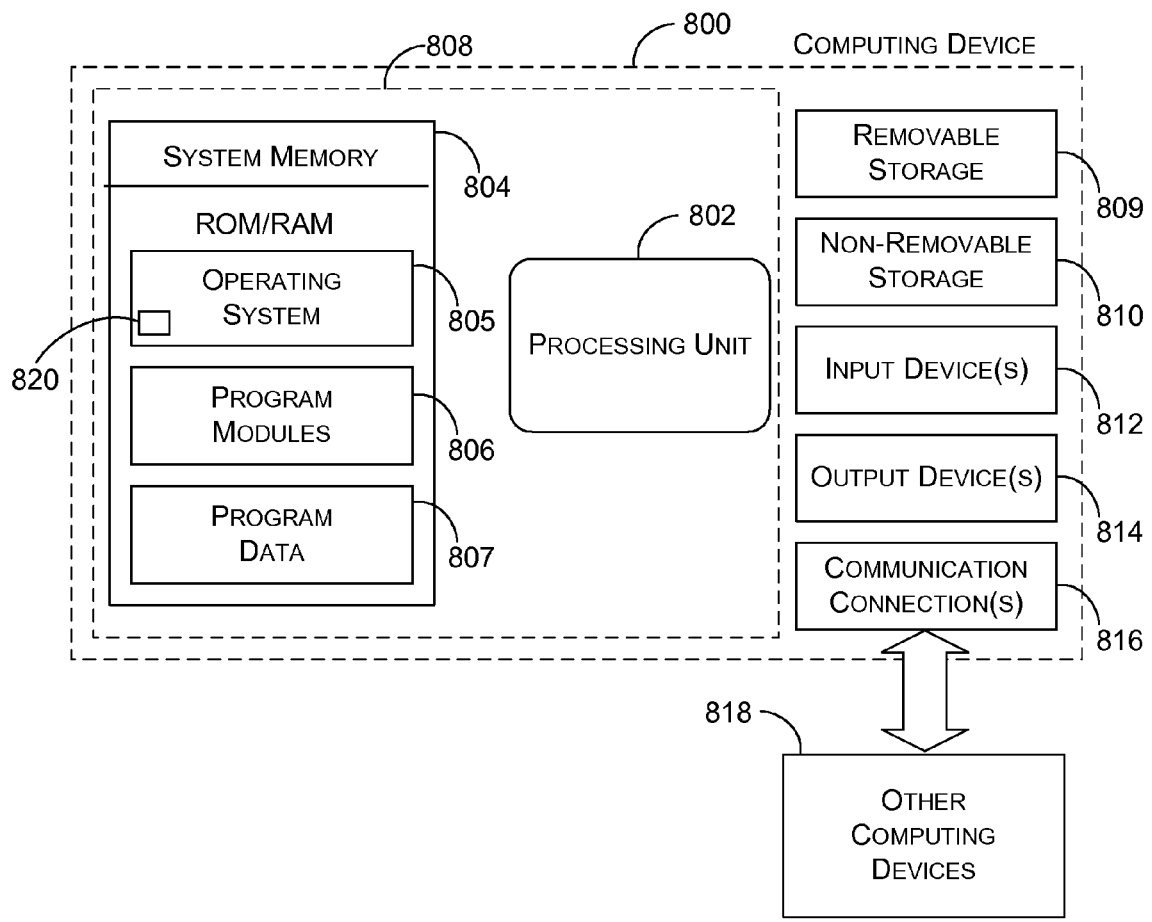
FIG. 8 is a block diagram of an exemplary computing device.

FIG. 8 illustrates an exemplary computing device 800 that may be used to implement various exemplary components and in forming an exemplary system. For example, the computing devices of the system of FIG. 1 may include various features of the device 800.

In a very basic configuration, computing device 800 typically includes at least one processing unit 802 and system memory 804. Depending on the exact configuration and type of computing device, system memory 804 may be volatile (such as RAM), non-volatile (such as ROM, flash memory, etc.) or some combination of the two. System memory 804 typically includes an operating system 805, one or more program modules 806, and may include program data 807. The operating system 805 include a component-based framework 820 that supports components (including properties and events), objects, inheritance, polymorphism, reflection, and provides an object-oriented component-based application programming interface (API), such as that of the .NET™ Framework manufactured by Microsoft Corporation, Redmond, Wash. The device 800 is of a very basic configuration demarcated by a dashed line 808. Again, a terminal may have fewer components but will interact with a computing device that may have such a basic configuration.

Computing device 800 may have additional features or functionality. For example, computing device 800 may also include additional data storage devices (removable and/or non-removable) such as, for example, magnetic disks, optical disks, or tape. Such additional storage is illustrated in FIG. 8 by removable storage 809 and non-removable storage 810. Computer storage media may include volatile and nonvolatile, removable and non-removable media implemented in any method or technology for storage of information, such as computer readable instructions, data structures, program modules, or other data. System memory 804, removable storage 809 and non-removable storage 810 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media may be part of device 800. Computing device 800 may also have input device(s) 812 such as keyboard, mouse, pen, voice input device, touch input device, etc. Output device(s) 814 such as a display, speakers, printer, etc. may also be included. These devices are well known in the art and need not be discussed at length here.

Computing device 800 may also contain communication connections 816 that allow the device to communicate with other computing devices 818, such as over a network (e.g., consider the aforementioned network 105 of FIG. 1). Communication connections 816 are one example of communication media. Communication media may typically be embodied by computer readable instructions, data structures, program modules, etc.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, implemented by a computing device, comprising:
   receiving a request to register a peer in a peer-to-peer system, the peer-to-peer system enabling a first peer of the peer-to-peer system to provide a first storage area to another peer of the peer-to-peer system and enabling the first peer of the peer-to-peer system to store data in a second storage area on a second peer of the peer-to-peer system after providing the first storage area;
   generating or selecting a transaction key for the peer;
   storing the transaction key in association with registration information for the peer;
   receiving a password from the peer to enable a secure transmission of the transaction key to the peer;
   transmitting the transaction key from the server to the peer, the transaction key accessible to the peer using the password;
   in response to receiving a transaction request from the peer to perform a peer-to-peer transaction with another peer of the peer-to-peer system, generating a token including file information for a file associated with the peer-to-peer transaction and including a signature, the token generated based at least in part on the transaction key;
   sending the token from the server to the peer to enable the peer to perform the peer-to-peer transaction; and
      in response to a failure of the second peer to authenticate a second token associated with a second peer-to-peer transaction, receiving information associated with the failure from the second peer.

2. The method of claim 1 wherein the transaction key is independent of the password.

3. The method of claim 1 wherein the transaction key comprises a cryptographic key.

4. The method of claim 1 wherein the token comprises a format that specifies a type of transaction.

5. The method of claim 1 wherein the token comprises a format that specifies an expiration time for the token.

6. The method of claim 1 wherein the token comprises a transaction identifier selected from a group consisting of a timestamp and a number generated by a message counter.

7. The method of claim 1 further comprising randomly generating or selecting an encryption key for the peer.

8. The method of claim 7 further comprising storing the encryption key in association with registration information for the peer and transmitting the encryption key to the peer.

9. A computing device comprising:
   a processor and a computer-readable storage device;
   a module maintained on the computer-readable storage device, the module including instructions that are executable by the processor to:
      receive a request to register a peer in a peer-to-peer system in which, in response to a first peer of the peer-to-peer system providing a first storage area to another peer of the peer-to-peer system, a second storage area on a second peer of the peer-to-peer system is provided to the first peer to store data;
      generate or select a transaction key for the peer;
      store the transaction key for the peer in association with registration information for the peer;
      securely transmit the transaction key to the peer by password protecting the transaction key using a password provided by the peer;

in response to receiving a transaction request from the peer to perform a peer-to-peer transaction, generate a token including file information for a file associated with the peer-to-peer transaction and including a signature, the token generated based at least in part on the transaction key;

send the token from the server to the peer to enable the peer to perform the peer-to-peer transaction; and in response to a failure of the peer to authenticate a second token associated with a second peer-to-peer transaction, receiving information associated with the failure from the peer.

10. The module of claim 9 wherein the transaction key comprises a cryptographic key.

11. The module of claim 9 wherein the token comprises a transaction type.

12. The module of claim 9 further comprising computer-executable instructions that are executable by the computer to determine if a peer-to-peer transaction occurred successfully based at least in part on information received from the other peer.

13. The module of claim 9 further comprising computer-executable instructions that are executable by the computer to generate or select an encryption key for each peer in the peer-to-peer system.

14. The module of claim 9 further comprising computer-executable instructions that are executable by the computer to store an encryption key for each peer in the peer-to-peer system.

15. The module of claim 9 further comprising computer-executable instructions that are executable by the computer to provide an application programming interface to receive information from a peer in the peer-to-peer system and to return a token in response.

16. A computer-readable storage device including instructions executable by a processor to perform operations comprising:

in response to receiving a registration request from a peer, registering the peer in a peer-to-peer system in which, in response to a first peer of the peer-to-peer system providing a first storage area to another peer of the peer-to-peer system, a second storage area on a second peer of the peer-to-peer system is provided to the first peer to store data;

generating or selecting a transaction key for the peer;

associating the transaction key with registration information for the peer;

transmitting the transaction key from the server to the peer, the transaction key protected by a password provided by the peer;

in response to receiving a transaction request from the peer to perform a particular transaction in the peer-to-peer system, generating a token including file information for a file associated with the particular transaction and including a digital signature, the token generated based at least in part on the transaction key;

sending the token from the server to the peer to enable the peer to perform the particular transaction; and in response to the second peer of the peer-to-peer system failing to authenticate a second token associated with a second peer-to-peer transaction, receiving information associated with the authentication failure from the second peer.

17. The computer-readable storage device of claim 16, wherein the token includes an identifier associated with the peer.

18. The computer-readable storage device of claim 16, wherein the token includes an expiration time after which the token is invalid.

19. The computer-readable storage device of claim 16, further comprising receiving failure data from the peer indicating that the peer failed to verify an invalid token based on an expiration date included in the invalid token.

20. The computer-readable storage device of claim 16, wherein the token includes a transaction type.

21. The computer-readable storage device of claim 20, wherein the transaction type comprises one of a store data transaction type to store data provided by the peer, a retrieve data transaction type to retrieve data from a specified location, a stream data transaction type to stream data to the peer, and a universal transaction type.

22. The computer-readable storage device of claim 16, wherein in response to receiving the registration request that includes the password, the peer is logged in using at least one of a secure socket layer (SSL) protocol or a transport layer security (TLS) protocol.

* * * * *